Sept. 12, 1944.　　　　C. B. MOORE　　　　2,358,242
AIR CONTROL INSTRUMENT
Filed Jan. 3, 1940
FIG. 1.
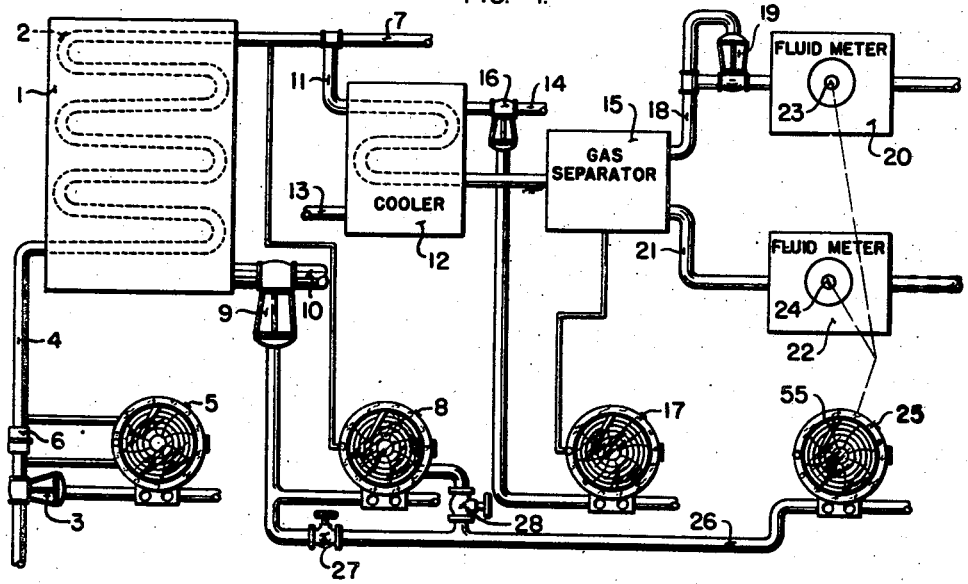
FIG. 2.
FIG. 3.
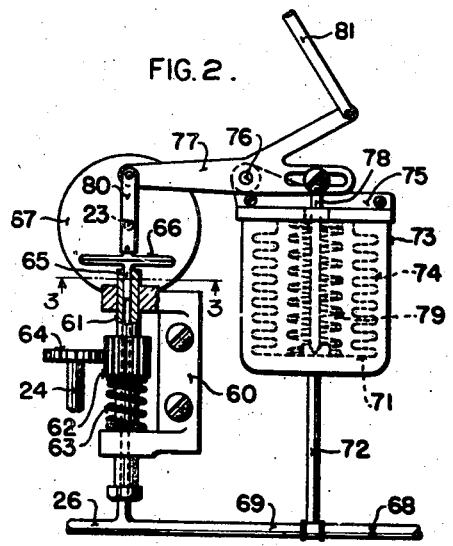
INVENTOR
COLEMAN B. MOORE
BY
ATTORNEY Patented Sept. 12, 1944

2,358,242

UNITED STATES PATENT OFFICE 2,358,242

AIR CONTROL INSTRUMENT

Coleman B. Moore, Carroll Park, Pa., assignor to The Brown Instrument Company, Philadelphia, Pa., a corporation of Pennsylvania Application January 3, 1940, Serial No. 312,303

3 Claims. (Cl. 137—140)

The present invention relates to air control instruments that may be used to set up a controlling pressure proportional to the value of a variable condition or to the ratio between the values of a plurality of conditions. Instruments of this type may be used to control the value of any measurable condition such as temperature, pressure or flow in response to variations in similar or related conditions.

For purposes of illustration the invention is described in connection with a tubular oil still in which it is desired to control the rate of cracking. In such a still oil is forced under pressure through the tubes of the still and is heated to a high temperature. This cracks the oil or changes it from heavy to light hydrocarbons and the amount of the latter that are produced has a bearing on the efficiency of the still. In order to control the process the amount of heat supplied to the still is varied in response to the rate at which the oil is cracked. This is determined by taking a sample of the liquid and vapor in the line leaving the still and separating the liquid from the gas. The ratio of the volumes of these constituent quantities is then used to vary the fuel supplied to the still.

The instrument of my invention is used in connection with meters measuring the flow of gas and liquid from the sampling line to set up a control pressure responsive to the ratio thereof, which pressure is used to vary the application of heat to the still.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a diagrammatic view of the various components of the control system;

Fig. 2 is a view of one form which the instrument may take; and

Fig. 3 is a view taken on line 3—3 of Fig. 2.

Referring to Fig. 1 there is shown an oil still I of conventional form in which are located convolutions of a tube 2 through which oil to be treated is forced under suitable pressure. A regulating valve 3 is located in the oil supply pipe 4. This valve is adjusted to insure the passage of a constant volume of oil by means of any suitable flow controller 5 that is responsive to the differential pressure in an orifice 6 located in the supply line 4. The temperature of the oil in the exit pipe 7 is measured by a temperature controller 8 of suitable type that is used to adjust the opening of a valve 9 in a fuel supply line 10. This controller may be omitted from the system, if desired, as will be later described.

As the oil in the tubes 2 is heated it tends to break down into lighter hydrocarbons, some of which are in liquid and some of which are in gaseous form. In order to perform the subsequent operations on the oil economically and at the same time produce the highest possible yield of the desired product it is determined by test what the best ratio between the gas and liquid is for the oil being used. This ratio may be maintained by changing the temperature of the still.

In order to determine relative amounts of gas and liquid a sampling line 11 is inserted in the exit line 7 from the still to draw off a small portion of the product. This sample passes through a cooler 12 that is supplied with some cooling medium such as water through inlet and outlet pipes 13 and 14, respectively. As the sample leaves the cooler it goes to a gas separator 15 in which the liquid and gas are separated before they are measured. In order to take care of the varying rates of evaporation that will take place in the gas separator if the sample is discharged into it at different temperatures, a valve 16 is placed in the outlet line 14 for the cooling fluid in the cooler 12. This valve is adjusted by a suitable temperature controller 17 that is responsive to the temperature in the separator 15. The gas leaving the separator 15 passes through a line 18, having a pressure regulator 19 in it, to a gas volume measuring meter 20. The liquid leaving the separator 15 passes through a line 21 to a liquid volume measuring meter 22.

The meters 20 and 22 may be of any suitable commercial type but are preferably of the so-called displacement type in which the meter 20 is provided with a shaft 23 and the meter 22 is provided with a shaft 24, each of which rotate at a speed proportional to the volume of the fluid being measured. The gas and liquid discharged from the meters 20 and 22 may either be returned to the system or discharged to the atmosphere.

The relative speeds of rotation of shafts 23 and 24 are used with an instrument 25 to create an air pressure proportional to the ratio of the gas and liquid. This air pressure is applied through a line 26 in either one of two ways, depending upon the use of the instrument 8. If the control of the fuel to the still 1 is to be in response to temperature, as above described, a valve 27 will be kept closed and the pressure in line 26 will be used to reset or change the control point of the instrument 8 in accordance with the rate of cracking. This means that the value at which the controller 8 maintains the exit temperature of the oil in line 7 will be changed as the ratio between the gas and liquid in that line changes. If, on the other hand, the instrument 8 is to be used solely as a recorder to keep a record of the exit temperature of the oil, the instrument will have no control function. In such a case valve 27 will be open and a valve 28, in the line leading to instrument 8, will be closed so that the pressure in line 26 will be applied directly to the valve 9. In this case the temperature in the still is being controlled directly in response to the rate of cracking.

One form of mechanism by which the pressure in line 26 can be made proportional to the ratio of the speeds of shafts 23 and 24, or the relative volumes of gas and liquid obtained from the still 1 is shown in Fig. 2. In order to accomplish this the shafts 23 and 24 are extended into the casing of instrument 25 in any suitable or convenient manner. The rotation of these shafts may also be reduced or increased to suitable speeds by means of any well known form of gearing. The mechanism now to be described is located in the casing 25.

Referring to Fig. 2, there is shown a bracket 60 that may be attached in any suitable manner to the casing of instrument 25. Journalled for rotation in this bracket is a hollow sleeve 61 having an elongated pinion 62 formed on it, which pinion and sleeve are normally biased upwardly by a spring 63. The pinion is continuously rotated by a gear 64 on the end of shaft 24 that is rotated at a speed proportional to the volume of liquid in the sample taken from the exit pipe 7 of the still 1. Rotatably mounted in the upper end of the sleeve 61 is a valve that takes the form of short shaft 65 having a flat surface on one side as shown in Fig. 3. This shaft is formed integral with a driven disc 66 by which it is driven independently of the sleeve 61 at varying speeds from a driving disc 67 attached to the shaft 23. The disc 67 is, therefore, driven at a speed proportional to the volume of gas flowing through the meter 20, and may in turn drive the disc 66 at a speed proportional to the radial distance of the latter from the center of disc 67.

Air under suitable pressure is supplied past a restriction 68 in a pipe 69 to the sleeve 61 through which it passes to escape by way of a bleed opening 70 formed in the sleeve. If the sleeve 61 and shaft 65 are rotating at the same speed the escape of air through the opening 70 will be constant. When, however, either of shafts 23 or 24 change their speed the sleeve 61 and shaft 65 will be rotated relative to each other to vary the effective size of opening 70 to permit more or less air to escape therethrough. This will change the pressure in pipe 69 and in a chamber 71 that is in communication therewith by means of a branch pipe 72.

The chamber 71 is formed by the space between a cup shaped casing 73 and a bellows 74 that are attached at their open ends to a stationary bracket 75. Pivoted on the bracket at 76 is a lever 77 that has pivotally attached at one end a thrust rod 78 which engages with its lower end a socket attached to the end wall of bellows 74. Contraction of the bellows is opposed by a spring 79. The left end of lever 77 has pivoted to it a thrust link 80 having a socket formed in its lower end which receives a pivot bearing formed on the upper surface of disc 66.

Assume, for example, the rotation of shafts 23 and 24 to be in such a direction that the shaft 65 and sleeve 61 in Fig. 3 are both rotating counter-clockwise. Therefore, if the speed of 61 is increased relative to 65 the opening 70 will be closed off, increasing the pressure in line 69 and chamber 71. This increase in pressure will collapse bellows 74 and, through connection 78, move the lever 77 counter-clockwise. Such movement will force link 80, disc 66, and sleeve 61 downwardly against the force of spring 63 to move disc 66 outwardly along disc 67. The disc 66 will, therefore, be rotated faster so that its speed will equal that of sleeve 61. In this manner a state of equilibrium will be reached with the pressure in the system higher than it previously was. The same operation would take place if shaft 23 and thereby shaft 65, were slowed down with respect to shaft 24 and sleeve 61.

If the relative speeds of shafts 23 and 24 changed in the opposite manner opening 70 would have been given a larger effective opening to permit more air to escape therethrough. This would reduce the pressure in the system and permit bellows 74 to expand under the action of spring 79. Sleeve 61, disc 66 and lever 77 will thereby be moved under the action of spring 63 to move disc 66 toward the center of disc 67 to slow down the former. The system will then reach a position of equilibrium with a lower pressure than before.

The pipe 69 is connected to the pipe 26 so that the pressure changes produced therein by the relative speeds of shafts 23 and 24 can be applied to either change the control point of instrument 8 or act directly to adjust valve 9. Movement of lever 77 may be used to adjust a pen in the instrument 25 by means of a link 81 and any conventional linkage upon which said pen may be supported.

In the above description it has been assumed that both a gas meter and a liquid meter were necessary for the proper operation of the system. In some cases, however, it may be necessary to have only one meter or the other. If this is so the instrument of my invention is equally as applicable to set up a pressure proportional to the rotative speed of one shaft as it is of two. In order to do this, however, one of the parts that is rotated by either shaft 23 or 24 must be rotated at a constant reference speed.

If it is desired, the shaft 23 may be driven at a constant or reference speed. Then if the shaft 24 was connected to either meter shaft 23 or meter shaft 24 a pressure would be produced by the instrument that is proportional to the speed of the shaft used with respect to a constant. This pressure would then be applied to adjust valve 9 in accordance with either the volume of gas or oil as the case may be.

By the use of my instrument the heat supplied to the still 1 may be so adjusted that the resulting product has the desired proportions of gas and liquid. Any deviation therefrom will cause an increase or decrease in heat supplied to return the ratio of the gas and liquid produced to its optimum value.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In an air control instrument the combination with a first member driven at a constant speed, a valve member, means to drive said valve member at varying speeds from said first member, a second member driven at a variable speed proportional to the value of a condition, a port in said second member cooperating with said valve member, a supply of air under pressure adjusted by relative movement of said valve member and port, and means to adjust the speed of said valve member in response to variations in the air pressure.

2. In an air control instrument, the combination of a shaft rotated at speeds proportional to the value of a variable condition, a second shaft rotatable at speeds proportional to the value of a second condition, an air conduit, means to supply air to said conduit from a substantially constant pressure source, a valve member, a bleed port member connected to said conduit, said members cooperating to regulate said pressure supply, means to drive one of said valve and port members from the first shaft, means to drive the other of said valve and port members from the second shaft, whereby if they are not rotated at the same speeds their relation will change to vary the bleed of air through said port and therefore the pressure in said conduit, and means responsive to variations in pressure in said conduit to equalize the speeds of said valve and port members.

3. In an air control instrument the combination with a first member, means driving said first member, a valve member, means to drive said valve member at varying speeds from said first member, a second member driven at a variable speed proportional to the value of a condition, a port in said second member cooperating with said valve member, a supply of air under pressure adjusted by relative movement of said valve member and port, and means to adjust the speed of said valve member in response to variations in the air pressure.

COLEMAN B. MOORE.